May 5, 1953  R. B. MATTHEWS  2,637,344
ELECTROINDUCTIVELY ACTUATED VALVE
Filed Aug. 22, 1949  2 SHEETS—SHEET 1
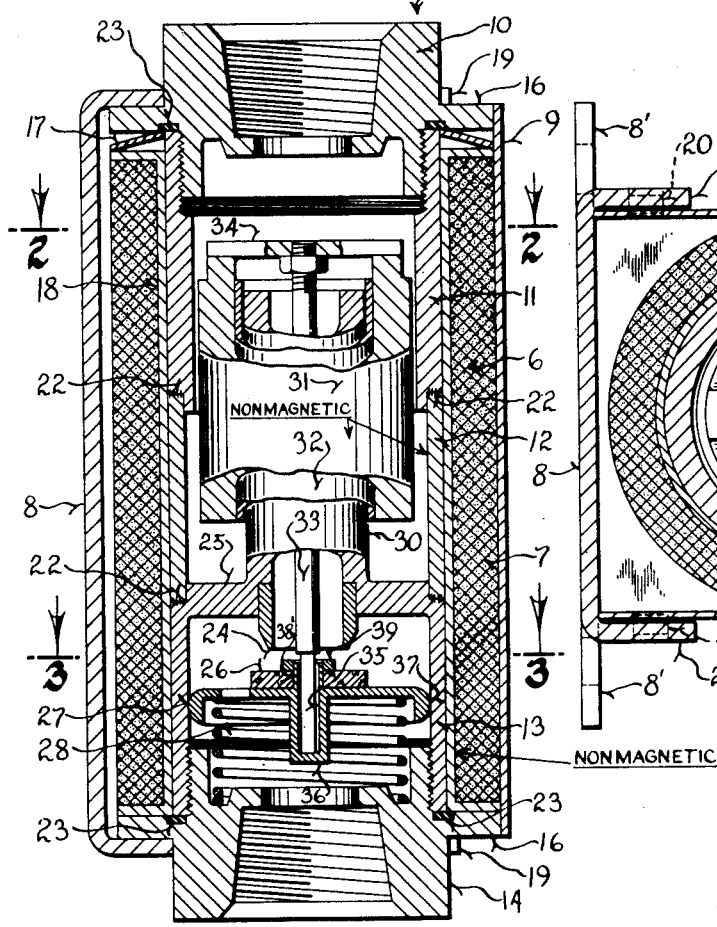
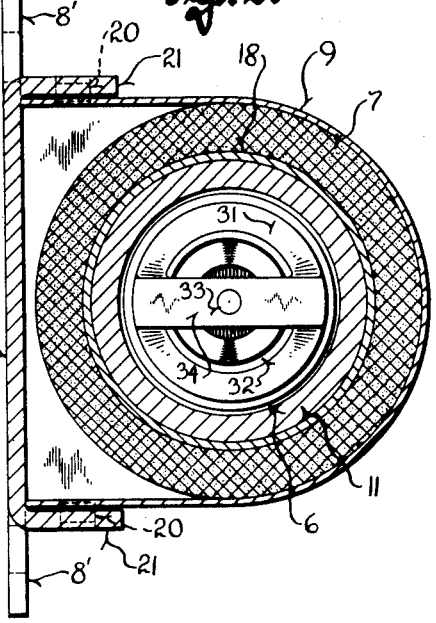
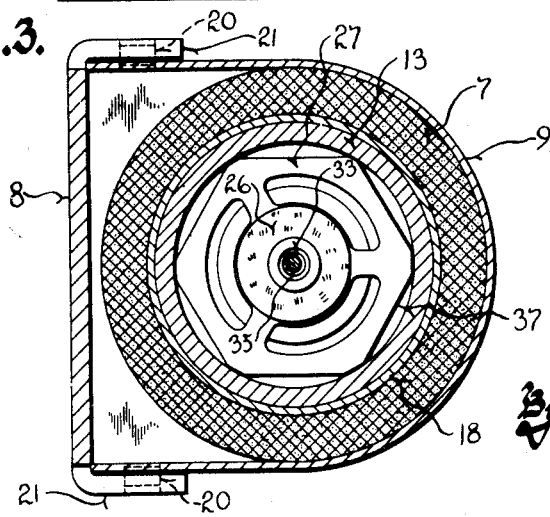
Inventor
Russell B. Matthews
By
Attorney May 5, 1953 R. B. MATTHEWS 2,637,344
ELECTROINDUCTIVELY ACTUATED VALVE
Filed Aug. 22, 1949 2 SHEETS—SHEET 2
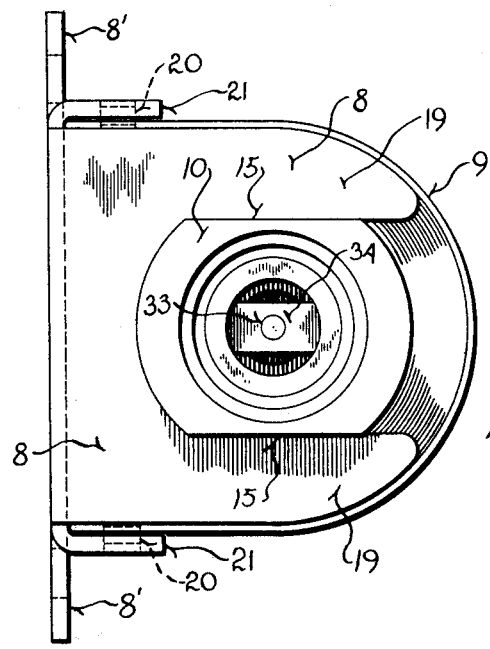
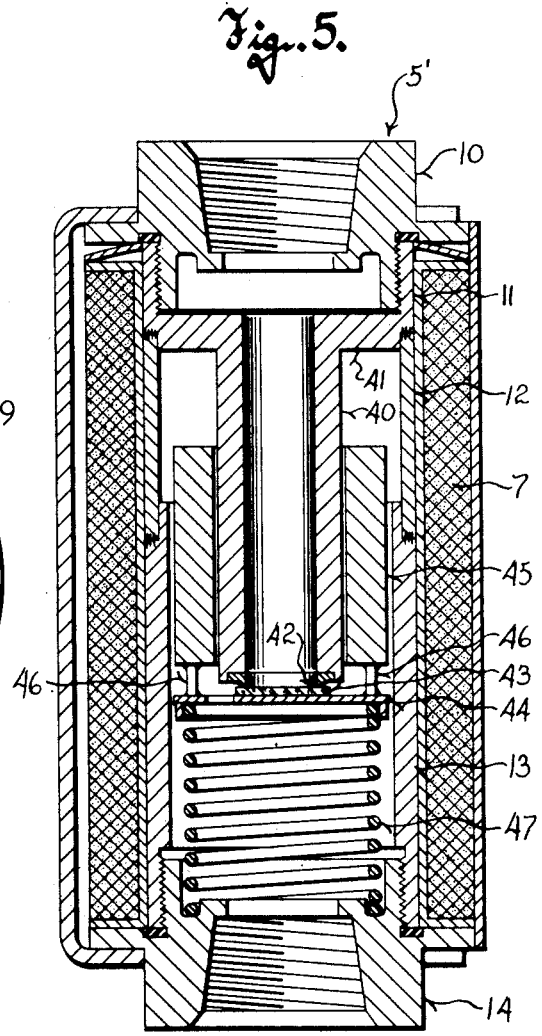
Inventor
Russell B. Matthews
By
Attorney Patented May 5, 1953

2,637,344

UNITED STATES PATENT OFFICE 2,637,344

ELECTROINDUCTIVELY ACTUATED VALVE

Russell B. Matthews, Wauwatosa, Wis., assignor to Milwaukee Gas Specialty Company, Milwaukee, Wis., a corporation of Wisconsin Application August 22, 1949, Serial No. 111,621

7 Claims. (Cl. 137—729)

This invention relates to valves and refers more particularly to valves actuated in response to energization and de-energization of a solenoid. This application is based upon a particular species of solenoid actuated valve similar to those described and claimed more broadly in my copending application Serial No. 121,817, filed October 17, 1949.

Solenoid actuated valves for controlling the flow of various types of fluid media have been known for many years, but heretofore such valves generally have been electromagnetically responsive, i. e. they depended upon magnetic attraction. Thus they comprised a solenoid wound about a magnetically permeable core or frame having an air gap therein and a movable armature or plunger of permeable material adapted to be magnetically attracted to a position in which it closed or bridged the air gap. The plunger or armature was mechanically connected with the valve itself, so that actuation of the valve was effected upon energization of the solenoid and consequent attraction of the plunger to the pole pieces at the air gap of the permeable frame.

As in such valves the magnetic attraction between the core or pole piece of a solenoid frame and its associated movable armature or plunger varies inversely as the square of the air gap distance between them, the force exerted upon the plunger is least at the beginning of its stroke and increases as the plunger approaches the pole pieces.

However, where the solenoid mechanism is employed to open a valve, the greatest force is required at the beginning of the plunger stroke, since at that point the valve is normally held against its seat by the pressure of the fluid being controlled, which, of course, must be overcome in order to unseat the valve. Once the valve has been "cracked," relatively little force is required to move it to its wide open position. To supply the force needed for opening the valve by means of the conventional solenoid, which provides the least amount of tractive force at the time when the greatest force is needed, and vice versa, it was necessary to use solenoids which were actually excessively powerful and which consumed disproportionately large amounts of current for the work actually required of them.

By contrast, it is an object of this invention to provide a solenoid actuated valve in which the solenoid plunger instead of being made of magnetically permeable material is of nonmagnetic but conductive material and so constructed that upon energization of the solenoid a magnetic field is induced in the plunger, which opposes that of the solenoid, so that the plunger is repelled rather than attracted, to thus provide the greatest tractive force during initial movement of the plunger.

As a corollary another object of this invention resides in the provision of a solenoid actuated valve of the character described in which a relatively small solenoid, drawing a comparatively small amount of electrical power, will be capable of controlling the flow of a fluid under relatively high pressure.

Another object of this invention is to provide a quietly operating valve by eliminating the impact which characterizes a conventional solenoid valve.

Another object of this invention is to provide an electro-responsive valve actuating means which is equally adaptable to either normally open or normally closed valves.

In this connection it is another object of this invention to provide an electro-responsive valve actuator which need not be mounted in any one specified position but may be installed upside down or on its side.

Another object of this invention resides in the provision of a solenoid actuated valve of the character described in which the unseating force required to be exerted upon the valve need only exceed the sealing force plus fluid pressure.

Another object of this invention resides in the provision of a compact and inexpensive solenoid actuated valve of the character described which will provide for a straight-through flow of fluid so that the capacity of the valve will be relatively large for its size.

Still another object of this invention resides in the provision of a solenoid actuated valve in which the plunger and valve are disposed for up and down movement but in which substantially the entire weight of the valve and plunger assembly is counterbalanced so that it will not be a factor in determining the tractive force required to effect opening of the valve.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which:

Figure 1 is a vertical sectional view of a solenoid actuated value embodying the principles of this invention;

Figure 2 is a cross-sectional view taken along the plane of the line 2—2 in Figure 1;

Figure 3 is a cross-sectional view taken along the plane of the line 3—3 in Figure 1;

Figure 4 is a top view of the valve device of this invention; and

Figure 5 is a view similar to Figure 3, but showing a modified embodiment of the invention.

Referring to the accompanying drawings, and more specifically to Figures 1 to 4, inclusive, the numeral 5 indicates generally the body portion of the solenoid actuated valve of this invention which is in the nature of a duct intended to be connected in a pipe line through which the fluid to be controlled flows.

Within this tubular body 5 is a valve structure indicated generally by the numeral 6 held open as long as a solenoid coil 7 which surrounds the body structure remains de-energized and closed instantly upon energization of the coil by alternating current. The valve is, therefore, normally open. A steel bracket 8 adapted to be fixed to an upright wall or other suitable support not only mounts the entire unit but overlies the exterior of the solenoid 7 to form part of its magnetic circuit; and a cover 9 also of magnetically permeable material coacts with the bracket to enclose the entire structure.

As will appear more fully hereinafter the valve has a straight-through flow characteristic, the fluid entering the bottom, passing directly through the center of the device and leaving the top. The duct 5 is made up of five axially aligned tubular members, namely, an upper head 10, an upper sleeve member 11, a center sleeve member 12, a lower sleeve member 13 and a lower head 14. The axially outermost of these members are the upper head 10 and the lower head 14 which are essentially pipe couplings of magnetically permeable material, and to facilitate production are identical.

To enable the device to be connected in a pipe line conveying the fluid which is to be controlled these upper and lower heads (10 and 14) have internal pipe taps and opposite flat parallel faces 15 with which a wrench may be engaged. Medially of their ends the heads 10 and 14 have annular flanges 16 between which the coil 7 is confined, a split conical spring washer 17 being interposed between the upper end of the coil and the adjacent flange 16 to hold the coil, which is slightly shorter than the distance between the flanges 16, against endwise displacement. It is, of course, understood that the coil 7 is wound upon a spool 18 made of nonmagnetic material, and that when the coil is energized by alternating current, the upper and lower heads 10 and 14 respectively take on the polarity of the adjacent ends of the coil, so that at any one instant the heads will have opposite polarity.

Arms 19 extending forwardly from the mounting bracket 8 engage over the flanges 16 in magnetic flux conducting relation thereto and confine the entire device therebetween, the arms 19 being bifurcated and the flattened opposite faces 15 of the heads engaging the straight inner edges of the bifurcations so that the device is held against rotation as shown in Figure 4.

Apertured attaching ears 8' extend from the sides of the bracket to provide for its attachment and the cover 9 which is formed of sheet metal and substantially U-shaped in cross-section is held in place by outward projections 20 formed therein and engaging in notches or holes in outwardly projecting tongues 21 on the bracket.

Inside the solenoid 7, the three inner parts of the composite duct assembly which comprise the body 5, namely the sleeves 11, 12 and 13, have their adjacent ends nested one within the other and are brazed or bonded together as at 22. The heads 10 and 14 are screwed into the sleeves 11 and 13 respectively with gaskets 23 interposed between the ends of the sleeves and the adjacent undersides of the annular flanges 16 on the heads.

Attention is directed to the fact that the magnetically permeable sleeves 11 and 13 project axially into each end of the solenoid 7, and since they are joined to the heads 10 and 14, not only have the same polarity as the heads but extend the magnetic circuit for the coil 7 axially into opposite ends of the coil. The inner flux path provided by the sleeves 11 and 13, however, is interrupted by the non-magnetic sleeve 12 separating the sleeves 11 and 13.

The valve structure 6 within the body comprises an annular valve seat 24 of stainless steel or other hard material concentrically secured in the underside of a web or flange 25 formed integrally with the top of the lower sleeve member 13 and a cooperating valve 26 of leather, neoprene or the like carried by a spider 27 which is axially slidable in the lower sleeve member 13 below the valve seat 24. A compression spring 28 confined between the underside of the spider and the lower head 14 yieldingly urges the valve toward its seated position and seats the same when the solenoid is energized as will be hereinafter more fully explained. When thus seated the valve shuts off the flow of fluid upwardly through the device but when unseated such fluid flow is permitted axially through the annular valve seat and an upright inner duct 30 of magnetically permeable material having its lower end joined to the web or flange 25 and its upper end portion projecting into the lower end of the sleeve 11 and spaced from the head 10. It is important to note that the radial space between the upper end portion of the inner duct 30 and the sleeve 11 is less than the spacing between either the upper free end of the inner duct and the head 10, or that between the adjacent ends of the sleeves 11 and 13, so that the magnetic circuit around the coil 7 may be said to be closed at its lower end and open at its upper end adjacent to the free end of the inner duct 30. Consequently, all of the magnetic flux generated by the coil 7 will be concentrated across the radial air gap between the free end portion of the inner duct and the lower end portion of the sleeve 11; and the direction of the field across the radial air gap will depend upon the polarity of the upper polar end of the solenoid and consequently sleeve 11 at any one instant, it being understood that the upper end of the duct 30 encircled by the sleeve 11 will be of opposite polarity at said instant since it is magnetically connected with the lower polar end of the coil 7.

Since the web or flange 25 is imperforate, all of the fluid entering the lower end of the tubular body will be constrained to pass through the inner duct 30. Control of the flow of such fluid is therefore readily effected by means of the valve 26.

The valve 26 is normally held in open position by the weight of a secondary coil or plunger comprising a heavy ring or collar 31 of copper or other highly conductive non-magnetic material, slidably mounted in the air gap between the inner duct 30 and the outer sleeve 11, and having an axial length sufficient to extend a substantial distance to either side of the junction between the nonmagnetic center sleeve or duct member 12 and the upper sleeve or duct member 11. The plunger is guided for up and down motion by sliding upon the inner duct 30 and to preclude sticking which might result from the rather rapid corrosion of copper by the sulphur and other corrosive impurities in gas, the bore of the plunger is lined with an aluminum sleeve 32.

Since the heads 10 and 14 and the upper and lower sleeves or duct members 11 and 13 as well as the inner duct 30 are all made of magnetically permeable material (such as SAE #1020 mild steel) it will be seen that the flux field generated by the solenoid coil 7 will lie in a continuous magnetically permeable path which extends through the head members 10 and 14, their flanges 16, the bracket 8, cover 9, and the upper and lower duct members 11 and 13 respectively, as well as the inner duct 30; while the nonmagnetic center sleeve or duct member 12 provides a discontinuity in the permeable frame or core surrounding the coil so that all of the flux generated by the coil 7 must pass across the radial air gap between the upper sleeve or duct member 11 and the inner duct 30. In this connection it will be noted that the inner duct 30 is long enough to have its free upper end portion radially opposite the upper sleeve or duct member 11 so that the plunger is inductively interlinked with the coil 7.

Energization of the solenoid coil 7 with an alternating current will result in the generation of a flux field of alternating polarity in the air gap between the overlapped ends of the inner and outer sleeves or duct members and consequently, since the plunger 31 is in effect a closed loop of good conductivity there will be induced in the plunger by transformer action an alternating current of substantially opposite polarity to that impressed upon the solenoid in its own right, and the alternating current so induced in it will in turn induce an alternating flux field about the plunger.

The field induced by the plunger, however, at all times opposes the field across the upper portion of the air gap and reinforces the air gap field across the lower portion of the gap remote from the free end of the inner duct 30. As a result the plunger will be repelled upwardly away from the lower closed end of the magnetic circuit for the coil 7 whenever the solenoid is energized, toward a position of equilibrium between the flux fields, which position is sufficiently high to enable the spring 23 to seat the valve 26.

Although the phase of the current induced in the plunger 31 is substantially opposite to that of the applied E. M. F., current flow is nevertheless in the same direction around the solenoid and plunger. Hence, at any one instant, as when the direction of the flux field across the radial air gap is from the inner duct 30 to the sleeve 11, current flows in a direction in the plunger such that the flux field generated thereby travels toroidally about the plunger, down its interior and upwardly along its exterior, and consequently radially inwardly at the top portion of the plunger counter to the air gap field thereat, and radially outwardly at the bottom portion of the plunger in the direction of the air gap field adjacent to the bottom of the plunger. This has the effect of diminishing or weakening the air gap field above the plunger while reinforcing the air gap field adjacent to the bottom of the plunger to make it considerably stronger than that at its top. Since the resulting force on the plunger is in the direction from the stronger field to the weaker field, the plunger is repelled with substantial force upwardly away from the closed end of the magnetic circuit, toward a raised position outside the influence of the air gap field between the overlapping portions of the inner duct 30 and the sleeve 11. As the plunger is repelled upwardly, however, the repelling force diminishes until it is just sufficient to balance the weight of the plunger, and equilibrium results at a position of the plunger sufficiently high to assure seating of the valve 26 by the spring 23.

Obviously, when current flows through the fixed solenoid in the reverse direction, the air gap field is inwardly from the sleeve 11 to the inner duct 30; and the current induced in the plunger effects generation of a toroidal flux field thereabout extending downwardly around the exterior of the plunger and upwardly through its interior, so that the direction of the field about the plunger will again be counter to the air gap field at the upper portion of the plunger and in the same direction as the air gap field adjacent to the bottom of the plunger, to thus create the stronger magnetic field at the lower end portion of the plunger and upward repulsion of the same toward the position of the equilibrium.

It is important to note that the repulsion of the plunger in a direction away from the closed end of the magnetic circuit around the coil 7, or outwardly of the free end of the inner duct 30, is assured by the fact that the overlapping portions of the tubular elements defining the radial air gap are magnetically connected to the opposite polar ends of the solenoid 7. Thus the polarity of the free end portion of the inner duct 30 will always correspond to the polarity of the end of the solenoid remote therefrom and to which it is magnetically connected, while the polarity of the outer sleeve 11 will always have the same polarity as the opposite end of the solenoid, to which the sleeve 11 is magnetically connected.

Downward motion of the plunger 31 in consequence to de-energization of the coil 7 is transmitted to the spider 27, and thus to the valve 26, through a rod or stem 33 extending axially down from a crossbar 34 brazed or otherwise secured to the top of the plunger. The upper end of the stem is threaded into a tapped hole in the center of the crossbar, and its lower end is stepped into a well 35 in the hub 36 of the spider 27.

The diameter of the well 35 is slightly larger than that of the stem portion received therein so as to compensate for any possible axial misalignment between the plunger and the spider, while at the same time affording some guidance to the spider to prevent tipping thereof. Normally the stem and spider move in unison, being held against axial separation by the weight of the plunger acting downwardly upon the stem and against the force of the compression spring 28.

The spider 27 which is, of course, perforated to permit fluid flow therepast is preferably hexagonal or otherwise polygonal, and of a size to slidably fit the bore of the sleeve of duct member 13, the polygonal shape providing guidance with a minimum of contact between the spider and the sleeve. The underside of the spider has a peripheral flange 37 to center the spring 28.

The valve 26 overlies the upper surface of the spider and is held in place thereon by an upward extension 38' of its hub which extends up through closely fitting holes in the valve and in a metal washer 39 overlying the valve.

Since the valve is normally open and is so held by the weight of the plunger 31 the spring must be light enough to preclude its overbalancing the weight of the plunger; but as will be readily apparent the spring will materially assist the inductive reaction during closure of the valve.

In the modified embodiment of the invention shown in Figure 5 the valve is normally closed, but in many respects the two embodiments of the invention are structurally similar. The tubular body 5' is again made up of upper and lower inlet and outlet heads 10 and 14 respectively, upper and lower sleeve or duct members 11 and 13 respectively and a center sleeve member 12 of stainless steel or other nonmagnetic metal; but in this instance the inner duct 40 extends down from a web or flange 41 at the top of the upper sleeve member 11 and the valve seat 42 is at the lower open end of the depending tubular post which forms the inner duct.

The valve 43 as before is carried on the top side of a spider 44 which in turn is connected directly to the lower end of the plunger cylinder 45 by a plurality of spaced apart posts 46. These connector posts may be of any nonmagnetic material. Since the valve is designed to be normally closed the plunger cylinder is made of aluminum for lightness even though it entails a sacrifice in conductivity as compared to copper; and as before the plunger is slidably received in the annular space between the overlapping ends of the lower sleeve member 13 and the inner duct 40.

A compression spring 47 confined between the lower inlet head 14 and the spider 44 slightly overbalances the weight of the plunger cylinder to close the valve when the solenoid coil 7 is deenergized. In this form of the invention the advantage of magnetic repulsion as distinguished from magnetic attraction is especially important since in this case energization of the solenoid opens the valve against the fluid pressure.

Attention is directed to the fact that the valve of Figure 5 need not be mounted in any specified position. It may be turned on end, i. e. upside down, in which case gravity will aid the force of the spring 47 to hold the valve closed. Of course, if the valve is mounted this way, slightly more power will be required to open it due to the need for lifting the weight of the plunger and valve assembly; and consequently the Figure 5 valve when "inverted" in this manner will not achieve one of the objects which is otherwise attained by valves of this invention, namely the counterbalancing of substantially the entire weight of the valve and plunger assembly, but this is not serious in view of the advantage of maximum power at initial operation which characterizes magnetic repulsion.

Also, since as a result of magnetic repulsion the plunger tends to center itself in its annular passage, the valve may be installed horizontally, and when so installed will work quite freely, whereas in a conventional solenoid actuated valve in which the armature is attracted upon energization of the coil, the plunger would be drawn to one side of its guide and become stuck.

From the foregoing description, taken together with the accompanying drawings, it will be apparent that this invention provides an efficient and unusually compact solenoid actuated valve which is well adapted for use in safety controls since its nonmagnetic plunger and magnetic repulsion mode of operation precludes "hang-up" of the plunger due to residual magnetism as encountered in conventional solenoids, and because of its quiet impactless operation. It will also be seen that the present invention makes it possible for the plunger to move axially away from the closed end of the magnetic circuit as voltage is increased, thereby maintaining wattage input at a constant value. Hence, the solenoid of this invention is far more efficient than conventional solenoids.

What I claim as my invention is:

1. A solenoid actuated valve for controlling the flow of a fluid under pressure, comprising: an outer duct having a fluid inlet at one end and a coaxial outlet at its other end, the opposite end portions of said duct being magnetically permeable and an intermediate portion of the duct being non-magnetically permeable; an A. C. solenoid surrounding said outer duct and fixed with respect thereto; magnetically permeable frame means extending around the exterior of said solenoid and magnetically connected with the opposite end portions of said outer duct; a magnetically permeable inner duct having an outside diameter substantially smaller than the inside diameter of said outer duct; magnetically permeable means joining one end portion of the inner duct with one of said permeable end portions of the outer duct to fixedly secure the inner duct coaxially within the outer duct with the opposite end portion of the inner duct radially opposite the other end portion of the duct and terminating within the same to define a radial air gap in the magnetic circuit including said frame means and said magnetically permeable ducts in which the magnetic flux generated by the fixed solenoid is concentrated, said magnetically permeable means also constraining fluid entering the outer duct to pass through the inner duct; an annular valve seat at one end of the inner duct; a valve inside the outer duct adjacent to said seat and movable back and forth toward and from engagement with the seat to control the flow of fluid through the inner duct; a movable solenoid disposed in said radial air gap so as to be inductively coupled with the fixed solenoid, and constrained to endwise back and forth movement axially in said air gap; means including a spring supporting the movable solenoid in a predetermined axial position in said air gap out of which the movable solenoid may be moved in one direction by repulsion due to the combined effects of the magnetic field generated by the fixed solenoid and that generated by the E. M. F. induced in the movable solenoid in consequence to energization of the fixed solenoid; and a connection between the movable solenoid and the valve for effecting movement of the valve to and from engagement with its seat in consequence to back and forth movement of said movable solenoid.

2. The valve set forth in claim 1 wherein the spring which yieldingly supports the movable solenoid in a predetermined axial position in the radial air gap exerts a yielding force on the valve tending to seat the same.

3. The valve set forth in claim 1 wherein said spring normally yieldingly holds the valve seated, and wherein the valve is opened against the biasing force thereon by repulsion of the movable solenoid in consequence to energization of the fixed solenoid.

4. The valve set forth in claim 1 further characterized by the fact that the valve is carried by a spider having guiding engagement with the wall of the outer duct; and by the fact that said movable solenoid has guiding engagement with a wall of one of the ducts and carries a rigid coaxial stem an outer end portion of which is loosely received in a well in the spider to thereby preclude tilting of the spider while at the same time permitting slight radial shifting between the movable solenoid and the spider.

5. The valve set forth in claim 4 wherein said spring exerts a force on the spider tending to move it in the same direction in which the movable solenoid is repelled, and wherein the valve is mounted on the spider so as to be yieldingly urged toward its seated position by the spring whenever the stem on the movable solenoid moves in a direction outwardly of the well in the spider.

6. In a valve: spaced concentric inner and outer tubular members defining a fluid passageway through the valve, said members being fixed with respect to one another and the outer tubular member extending a distance beyond one end of the inner tubular member to define a valve chamber; a valve element in said chamber movable to and from a position closing off the flow of fluid through said passageway; spring means acting on said valve and tending to move it toward its closed position; a solenoid surrounded by the outer tubular member and surrounding the inner tubular member; a stem extending axially inside the inner tubular member and movable endwise therein under the control of said solenoid; and a motion transmitting connection between said stem and the movable valve element.

7. In a device of the character described: annular magnetic field producing means; magnetically permeable frame means having a part encircled by said field producing means, said frame means providing a conducting path for magnetic flux produced by the field producing means and having a tubular portion spaced from and lying intermediate other portions of the frame means to define an air gap across which the flux is concentrated; a second annular field producing means movably mounted on the frame means in said gap and encircling said tubular portion of the frame means, said second field producing means being movable by repulsion in consequence of energization of one of said field producing means to produce a magnetic field thereabout which, at a portion of said air gap, opposes the field of the other field producing means; means for supporting said second field producing means in a predetermined position in said air gap and for constraining the second field producing means to repulsion produced motion coaxially of said tubular portion of the frame means to another position, said last named means including a stem connected with the second field producing means and received lengthwise in said tubular portion of the frame means; a control member movable from one position to another; and a connection between said control member and the stem whereby the position of the control member is determined by the position of the second field producing means.

RUSSELL B. MATTHEWS.

References Cited in the file of this patent

UNITED STATES PATENTS

| Number | Name | Date |
| --- | --- | --- |
| 363,186 | Thomson | May 17, 1887 |
| 1,085,425 | Hobe | Jan. 27, 1914 |
| 1,167,815 | Gold | Jan. 11, 1916 |
| 1,640,324 | Hibbard | Aug. 23, 1927 |
| 1,672,193 | Bason | June 5, 1928 |
| 1,980,736 | Trofimov | Nov. 13, 1934 |
| 2,217,141 | Sprenkle | Oct. 8, 1940 |
| 2,383,411 | Obszarney | Aug. 21, 1945 |